United States Patent [19]
Cryer

[11] 3,778,571
[45] Dec. 11, 1973

[54] DIRECTION INDICATOR SWITCHES FOR ROAD VEHICLES

[75] Inventor: Edward Cryer, Higham, near Burnley, England

[73] Assignee: Joseph Lucas (Industries) Limited, Birmingham, England

[22] Filed: Mar. 1, 1972

[21] Appl. No.: 230,600

[30] Foreign Application Priority Data
Mar. 20, 1971 Great Britain ..................... 7,540/71

[52] U.S. Cl. ............................................. 200/61.35
[51] Int. Cl. ............................................. H01h 3/16
[58] Field of Search ....................... 200/61.27–61.38

[56] References Cited
UNITED STATES PATENTS

| | | | |
|---|---|---|---|
| 3,459,909 | 8/1969 | Winogrocki et al. ............ | 200/61.34 |
| 2,817,728 | 12/1957 | Gurney ............................ | 200/61.35 |
| 3,076,067 | 1/1963 | Dryer et al ...................... | 200/61.3 |
| 3,665,130 | 5/1972 | Suzuki ............................ | 200/61.27 |
| 3,557,328 | 1/1971 | Winogrocki ..................... | 200/61.27 |

Primary Examiner—J. R. Scott
Attorney—John C. Holman et al.

[57] ABSTRACT

This invention relates to novel direction indicator switches for motor vehicles.

A direction indicator switch for a motor vehicle includes a rotor movable between two extreme operating positions and a central inoperative position. The rotor carries a pair of spring loaded pawls for engagement with a striker on a steering column of the motor vehicle. Each pawl has a slot therein through which passes a post on the pawl. A ball is carried in each slot and is movable in a profiled recess in the rotor so that movement of each pawl relative to the rotor is permitted in one direction to allow movement of the striker without movement of the rotor but is opposed in the other direction to permit movement of the rotor to its central position by one of the strikers moving in a switch cancelling direction when the rotor is not manually retained in one of its operating positions.

The switch provides an improved means whereby manual retention of the switch in an operative position is permitted when a switch cancelling movement of the striker occurs.

8 Claims, 5 Drawing Figures

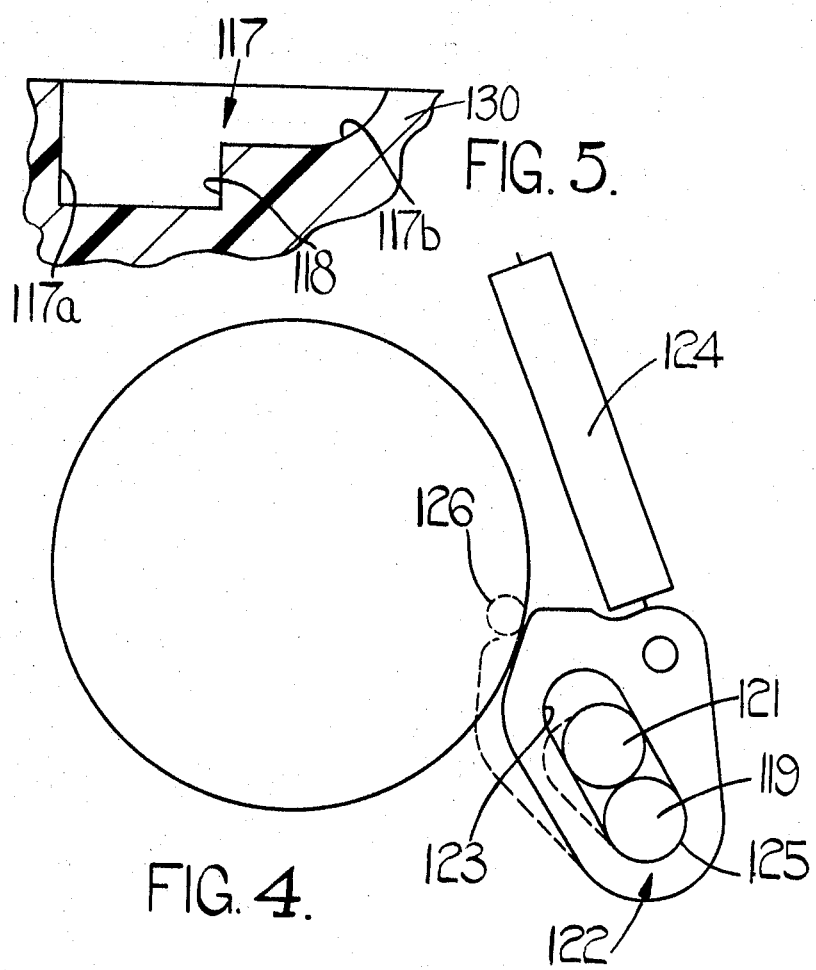

DIRECTION INDICATOR SWITCHES FOR ROAD VEHICLES

SUMMARY OF THE INVENTION

This invention relates to direction indicator switches for road vehicles.

FIELD OF THE INVENTION

A direction indicator switch, according to one aspect of the invention, comprises in combination a body for connection to the steering column of a road vehicle, a rotor mounted on the body for movement between an inoperative position and a pair of operative positions, a pair of pawls carried by the rotor, the arrangement being such that when the switch is in use on a vehicle, and the rotor is in an operative position, one of the pawls is located in the path of movement of a striker on the steering column of the vehicle, each pawl having therein a slot within which is engaged a post upstanding from the rotor, and resilient means urging one end of each slot into engagement with its respective post so as to mount the respective pawl for pivotal movement about the post, said one pawl, when located in the path of movement of the striker, being pivotable by the striker so as to allow the striker to move past the pawl in a first angular direction and further being movable by the striker in such a manner as to move the one end of its respective slot away from the post and thereby allow the striker to move past the pawl in the opposite angular direction, the striker when moving in one of the angular directions being arranged to engage the pawl and apply a force to the rotor to urge the rotor towards its inoperative position, and the resilient means being arranged so that when the striker is moving in the one angular direction and the rotor is in the operative position movement of the pawl relative to the post under the action of the striker is resisted by the resilient means so that, unless the rotor is held in the operative position, the striker moves the rotor to its inoperative position to cancel the switch.

In a fuller aspect, the invention resides in a direction indicator switch comprising in combination a body for connection to the steering column of a road vehicle, a rotor mounted on the body for movement between an inoperative position and a pair of operative positions, a pair of pawls carried by the rotor, the arrangement being such that when the switch is in use on a vehicle, and the rotor is in an operative position, one of the pawls is located in the path of movement of a striker on the steering column of the vehicle, each pawl having therein a slot within which is engaged a post upstanding from the rotor, and resilient means urging one end of each slot into engagement with its respective post so as to mount the respective pawl for pivotal movement about the post, movement of said striker in one angular direction pivoting said one pawl about its respective post so that the striker can move past the pawl, but the striker when moving in the opposite angular direction engaging the pawl to apply a force to the rotor to cancel the switch by moving the rotor to its inoperative position, movement of the striker in said opposite angular direction while the rotor is held in its operative position causing movement of the pawl as permitted by movement of the one end of its respective slot away from the post against the action of the resilient means.

Preferably, the pawl is prevented from pivotal movement when the striker is moving in the opposite angular direction by a ball located in the slot, the ball engaging an abutment on the rotor, the ball preferably moving along a groove in the rotor when the pawl is pivoted as a result of movement of the striker in the one angular direction.

BRIEF DESCRIPTION OF THE DRAWING

In the accompanying drawings, which illustrate one example of the invention,

FIG. 4 is a simplified plan view, to an enlarged scale, of part of FIG. 1 showing a pawl in an operative position and, in broken line, in an operative position; and FIG. 5 is a much enlarged and simplified view of a detail of FIG. 2.

DETAILED DESCRIPTION OF THE DRAWINGS

Figure 1:
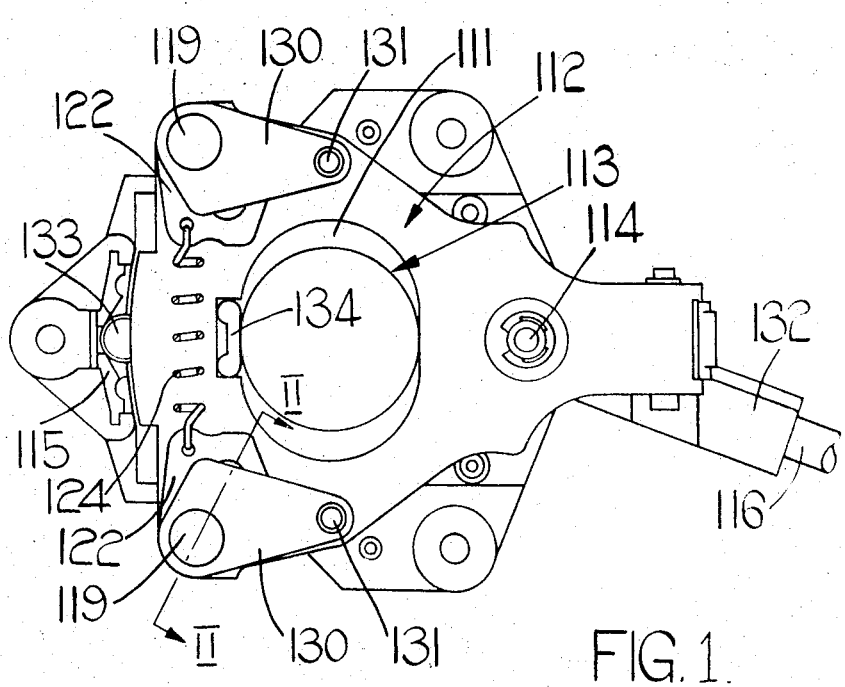
FIG. 1 is a plan view of the rotor of a switch.

Referring to the drawings, the switch includes a body 111 which is adapted for mounting adjacent a steering column of a road vehicle and a rotor 112 mounted on the body 111 so that when the body 111 is mounted adjacent the steering column of a road vehicle, in use, the steering column extends through a bore 113 in the rotor 112. A pivot post 114 extends through a hole in the rotor 112 and is journalled in the body 111 so that the rotor 112 is capable of angular movement relative to the body 111 about the post 114. At one end, the rotor 112 defines a detent surface 115 which, in use, co-operates with a spring-urged roller 133 carried by the body 11 to define resilient detent means for releasably retaining the rotor 112 during angular movement thereof, in a pair of operative positions and a central, inoperative position. It is to be appreciated that the dimensions of the bore 113 are sufficient to allow angular movement of the rotor 112 relative to the body 111 between inoperative position and said pair of operative positions when the switch is mounted on the steering column of a road vehicle, with the steering column extending through the bore 113 in the rotor 112. Further, connected with the rotor 112, via a member 132 which extends from the end of the rotor remote from the detent surface 115 is an operating lever 116 which, in use, is moved to impart movement to the rotor 112.

Figure 2:
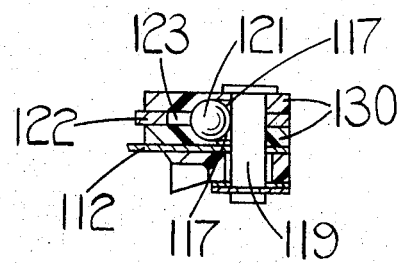
Figure 3:
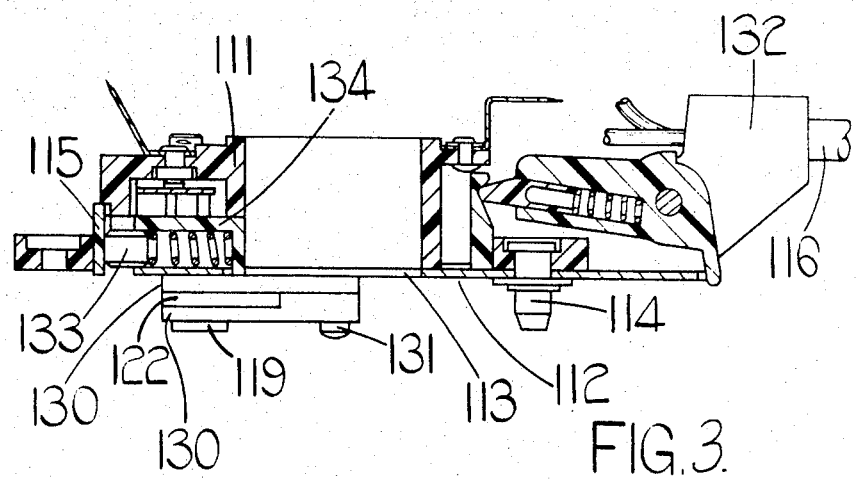
FIG. 3 is a sectional view of the switch of FIG. 1.

On opposite sides, respectively, of the bore 113 are a pair of pawls 122. A pair of pawl carriers 130 forming part of rotor 112 are disposed on opposite sides of each pawl 122. Formed in the face of each pawl carrier 130 adjacent the respective pawl is a substantially L-shaped groove 117, the base 118 of each groove being stepped to define a deep portion 117a and a shallow portion 117b (see FIG. 5). Referring now particularly to FIGS. 2 and 4, a post 119 is mounted in each of the pairs of respective deep portions 117a and is arranged to be a sliding fit therein. Mounted in each of the shallow portions 117b is a ball 121, the dimensions of the portions 117b being such that each ball 121 projects from said one surface of the rotor 112 and is capable of movement along its respective portion 117b. Each pawl 122, is formed with a slot 23 therein and is mounted between the grooves 117 in the respective pawl carriers 130 so that portions of the post 119 and the ball 121 projecting between said grooves 117 are received in the slot 123 of the respective pawl 122. Secured at its ends to the pawls 122 respectively is a helical tension spring 124 which is arranged to urge a closed end 125 of the slot 123 in each pawl 122 against a respective post 119.

Thus, the spring 124 mounts the pawls 122 for pivotal movement about the posts 119, it being appreciated that each ball 121 moves along the portions 117b of its respective grooves 117 when the pawls 122 pivot about the posts 119. Further, the dimensions of slots 123 are such that the closed ends 125 of the slots are capable of linear movement away from their respective posts 119 against the action of the spring 124.

As previously stated, the switch is used to control operation of the direction indicator lamps of a road vehicle and is arranged so that when the switch is mounted on the steering column of the road vehicle with the steering column extending through the bore 113 in the rotor 112, a striker 126, indicated by the broken line in FIG. 4, is positioned adjacent the pawls 122. Movement of the striker 126 as the steering column is rotated is such that when the rotor 112 is in its inoperative position the striker 126 does not engage either of the pawls 122 which are each in the position indicated in full line in FIG. 4, but when the rotor 112 is in an operative position one of the pawls is located in the path of movement of the striker 26 so as to be engaged thereby as indicated in broken line in FIG. 4. However, the direction of the resilient action of the spring 124 is arranged to be such that each pawl 122 is urged to a position wherein the ball 121 carried by the respective pawl 122 is located in abutment with one end of its respective groove portions 117b. Thus, when a pawl 122 is located in the path of the striker 126 and the striker is moved to engage the pawl, although the movement of the striker 126 will apply a force to the pawl 122 tending to pivot the pawl about the post 119, pivotal movement of the pawl 122 will be prevented if such movement is in a direction to urge the ball 121 against abutment means formed by the closed ends of its respective portions 117b. Of course, pivotal movement of the pawl 122 under the action of the striker 126 in the other direction is not prevented, the ball 121 then moving along the portions 117b of its respective grooves 117 as the pawl 122 pivots.

Considering now the situation where, in use, the rotor 112 is moved to an operative position in which the pawl 122 as shown in FIG. 4 is moved into the path of movement of the striker 126, i.e., into its position indicated in broken line. Then, when the steering column of the vehicle using the switch is moved in a direction such that the striker 126 moves in an anticlockwise direction as viewed in FIG. 4, the striker 126 upon engaging the pawl 122 will pivot the pawl about the post 119 against the action of the spring 124. When the striker 126 has moved past the pawl 122 then the spring 124 will urge the pawl 122 back into the path of movement of the striker 126. This mode of operation of the switch is normally termed "ratcheting", the switch being arranged so as to operate in this manner when the vehicle using the switch is being steered in the direction indicated by the indicator lamp. If, however, with the pawl 122 shown in FIG. 4 in the path of movement of the striker 126, the striker is moved in a clockwise direction when viewed in FIG. 4, then pivotal movement of the pawl 122 under the action of the striker 126 is prevented by engagement of the ball 121 with said abutment means formed by said closed ends of its respective portions 117b. In this situation, when the striker 126 engages the pawl 122, the striker applies a force to the pawl 122 to urge the closed end 125 of the slot 123 away from the post 119 and against the action of the spring 124. It is to be appreciated, however, that the force applied by the striker 126 in this situation also tends to urge the rotor back to its inoperative position against the action of said detent means retaining the rotor in its operative position. The switch is arranged so that the force required to move the closed end 125 away from the post 119 against the action of the spring 124 is greater than the force required to move the rotor 112 from its operative to its inoperative position against the action of the detent means. Thus when, as shown in FIG. 4, the pawl 122 is in its operative position and the striker 126 is moving in a clockwise direction and engages the pawl 122, the striker 126 moves the rotor 112 back to its inoperative position to cancel the switch. However, if the lever 116 is gripped to hold the rotor 112 in its operative position as shown in FIG. 4, then when the striker 126 engages the pawl 122 movement of the rotor 112 back to its inoperative position will be prevented so that the striker 126 will urge the closed end 125 of the slot 123 away from the post 119 against the action of the spring 124. In this way, the striker 126 can be moved past the pawl 122 in a clockwise direction without cancelling the switch.

It is of course to be appreciated that, in one operative position of the rotor 112 the left-hand indicator lamp of the vehicle using the switch will be energised, whereas in the other operative position of the rotor 112 the right-hand indicator lamp will be energised. Thus, the pawls 122 will be arranged so that if one of the pawls is located in the path of the striker 126 in one operative position of the rotor 112, and is pivoted by the striker 126 during movement of the striker in one angular direction, then the other pawl 122, when in its operative position, will be prevented by its respective ball 121 from being pivoted by the striker 126 during movement of the striker in the one angular direction. Further, it is to be appreciated that the arrangement described could be modified so that when the rotor 112 is held in an operative position against cancelling by the striker the operative pawl is pivoted out of the path of movement of the striker. In such a modification, the closed ends of the slot in the operative pawl would be moved by the striker away from its respective post during ratcheting.

The switch as illustrated includes switching assemblies operable by appropriate movements of the lever 116. However, such assemblies form no part of the present invention and will not be described.

I claim:

1. A direction indicator switch comprising, in combination, a body for mounting adjacent a steering column of a road vehicle, a rotor mounted on said body for movement between an inoperative position and a pair of operative positions, a pair of pawls carried by said rotor, a slot in each said pawl, a pair of posts upstanding from said rotor and being respectively engaged in said slot, resilient means urging one end of each said slot into engagement with its respective post so as to mount the respective pawl for pivotal movement about said post, a ball mounted in each said slot and movable relative to said rotor upon pivotal movement of the respective pawl about said post, and abutment means fixed relative to the rotor; the arrangement being such that, when the switch is in use on a vehicle and the rotor is in an operative position, one of the pawls is disposed in the path of movement of a striker on the steering column and movement of the striker in one angular direction pivots said one of the pawls about its respective post so that the striker can move past the pawl; the pawl being movable by the striker, when the latter is moving in the opposite angular direction, in such a manner that the said one end of its respective slot is moved away from the post thereby allowing the striker to move past the pawl, said pawl being prevented from pivoting about said post by engagement of the respective ball with the respective abutment means; the striker, when moving in one of said angular directions, being arranged to engage the pawl and apply a force to the rotor to urge the latter towards its inoperative position and said resilient means being arranged so that, when said striker is moving in said one of said angular directions and said rotor is in said operative position, movement of said pawl relative to said post under the action of said striker is resisted by said resilient means so that, unless the rotor is held in said operative position, the striker moves the rotor to its inoperative position to cancel the switch.

2. The switch according to claim 1, wherein groove means are provided in the rotor within which groove means the balls are movable and wherein said abutment means are constituted by closed ends of the groove means.

3. The switch according to claim 1, wherein resilient detent means are provided for releasably retaining the rotor in any one of its three positions, and wherein the pawl, the resilient means and the resilient detent means are arranged so that the force required to move the rotor from its operative to its inoperative position against the action of the detent means is less than the force required to move the end of the slot away from the post against the action of the resilient means.

4. The switch according to claim 1, wherein the resilient means comprises a spring extending between and connected at its ends to the pawls.

5. A direction indicator switch comprising, in combination, a body for mounting adjacent a steering column of a road vehicle, a rotor mounted on said body for movement between an inoperative position and a pair of operative positions, a pair of pawls carried by said rotor, a slot in each said pawl, a pair of posts upstanding from said rotor and being respectively engaged in said slots, resilient means urging one end of each slot into engagement with its respective post so as to mount respective pawl for pivotal movement about said post, a ball mounted in each said slot and movable relative to said rotor upon pivotal movement of the respective pawl about said post, and abutment means fixed relative to the rotor; the arrangement being such that, when the switch is in use on a vehicle and the rotor is in an operative position, one of the pawls is disposed in the path of movement of a striker on the steering column and movement of the striker in one angular direction pivots said one of the pawls about its respective posts so that the striker can move past the pawl; the striker, when moving in the opposite angular direction, engaging the pawl to apply a force to the rotor to cancel the switch by moving the rotor to its inoperative position, movement of said striker in said opposite angular direction while the rotor is held in its operative position causing movement of said pawl as permitted by movement of said one end of its respective slot away from said post against the action of the resilient means, pivotal movement of said pawl about the respective post being prevented by engagement of the ball with the abutment means.

6. The switch according to claim 5, wherein groove means are provided in the rotor within which groove means the balls are movable, and wherein said abutment means are constituted by closed ends of the groove means.

7. The switch according to claim 5, wherein resilient detent means are provided for releasably retaining the rotor in any one of its three positions, and wherein the pawl, the resilient means and the resilient detent means are arranged so that the force required to move the rotor from its inoperative to its operative position against the action of the detent means is less than the force required to move the end of the slot away from the post against the action of the resilient means.

8. The switch according to claim 5, wherein the resilient means comprises a spring extending between and connected at its end to the pawls.

* * * * *